United States Patent [19]

Holle et al.

[11] Patent Number: 5,744,108
[45] Date of Patent: Apr. 28, 1998

[54] PROCESS FOR THE THERMAL TREATMENT OF TITANIUM DIOXIDE IN A CIRCULATING FLUIDIZED BED AND THE USE THEREOF

[75] Inventors: Bernd-Michael Holle; Eckhard Bayer, both of Krefeld; Jörg Krekel, Essen, all of Germany

[73] Assignee: Bayer AG, Leverkusen, Germany

[21] Appl. No.: 778,873

[22] Filed: Jan. 2, 1997

[30] Foreign Application Priority Data

Jan. 15, 1996 [DE] Germany .................. 196 01 143.4

[51] Int. Cl.$^6$ .................. C01G 23/00; C01G 23/047
[52] U.S. Cl. .................. 423/74; 423/610
[58] Field of Search .................. 423/74, 610

[56] References Cited

U.S. PATENT DOCUMENTS

| 2,721,787 | 10/1955 | Hettrick | 23/202 |
| 4,076,796 | 2/1978 | Reh et al. | 423/659 |

FOREIGN PATENT DOCUMENTS

| 0 396 975 | 11/1990 | European Pat. Off. |
| 0 418 632 | 3/1991 | European Pat. Off. |
| 1 167 144 | 11/1958 | France |
| 2524540 | 12/1976 | Germany |
| 38 40 196 | 4/1990 | Germany |

OTHER PUBLICATIONS

Orbit Abstract of EP 0 396 975 (Nov. 14, 1990).
Orbit Abstract of EP 0 418 632 (Mar. 27, 1991).
Abstract of DE 2524540 (Dec. 23, 1976).
DIN 55 983, *Testing of pigments, comparison of colour of white pigments in full shade systems*, pp. 284–286, Dec. 1983.
DIN ISO 787, *General methods of test for pigments and extenders; comparison of colour, in full–shade systems, of white, black and coloured pigments—Colorimetric method; Identical with ISO/DIS 787-25: 1991*; pp. 1–15, Mar. 1992.
Ullmanns Enzyklopadie der techn. Chemie, 4$^{th}$ Edition, vol. 18, p. 574, Jan. 1982.
Orbit Abstract of DE 38 40 196 (Apr. 12, 1990).
1991:45065 Prep of Tit Dioxide Pigments, 1990, Wiederhoeft et al.
1994:80746 Buetje et al, Manufacture of High Purity Titania, 1993.

*Primary Examiner*—Ferris Lander
*Attorney, Agent, or Firm*—Connolly & Hutz

[57] ABSTRACT

The present invention relates to a process for the production of titanium dioxide pigments and the use thereof.

24 Claims, 1 Drawing Sheet

PROCESS FOR THE THERMAL TREATMENT OF TITANIUM DIOXIDE IN A CIRCULATING FLUIDIZED BED AND THE USE THEREOF

The present invention relates to a process for the production of titanium dioxide pigments and the use thereof.

Titanium dioxide occurs naturally in three modifications, as rutile, anatase and brookite. The crystal forms rutile and anatase are of industrial importance primarily as white pigments and to a lesser extent as technical material, for example, for catalysts. The production is carried out by means of two industrial processes, the sulphate process and the chloride process (see Ullmanns Enzyklopädie der techn. Chemie, 4th Edition, Volume 18, page 574).

The older sulphate process is based on the decomposition of titanium raw materials using sulphuric acid. A relatively pure titanium dioxide hydrate is precipitated out from the sulphuric acid solution by thermal hydrolysis. After various physical and chemical purification processes and optionally after the addition of modifiers and rutile nuclei, the hydrate is then calcined in rotary kilns and heated at temperatures of from about 800° to 1100° C. to form the anatase or rutile modification. This so-called furnace clinker is subsequently ground and in most cases is aftertreated in various ways depending on the intended use.

In the chloride process, the correspondingly worked-up titanium raw materials are chlorinated together with a combustion fuel in a fluidized bed reactor. After it has been purified to remove numerous by-products the titanium tetrachloride, usually after the addition thereto of aluminium chloride, is burnt at temperatures of above about 1000° C. to form titanium dioxide in the rutile form and the chlorine is recovered. The pigment, as in the sulphate process, is then usually aftertreated.

The two production processes yield pigments having to some extent differing properties. The most important properties of the pigments are the optical properties, such as whitening power, scattering power and covering power, lightness, hue, gloss and gloss covering, also dispersibility as well as resistance to light and weather resistance. These properties are dependent mainly on the particle size and particle distribution, on the crystal modification, on the amounts of traces of chemical elements in the crystal lattice and on the inorganic and organic aftertreatment as well as on the final micronisation.

In the sulphate process, the calcination is in most cases carried out in rotary kilns of about 30 to 60 m in length, after the hydrate has been treated with the necessary doping chemicals and dehydrated to about 40 to 50 wt. % of solids by means of filtering apparatus. These rotary kilns are heated directly with combustion gases introduced in countercurrent to the solid matter. About two thirds of the length of the kiln serves for the drying of the product and the abstraction of the bound sulphuric acid. The temperature at which the furnace clinker is discharged ranges from about 800° to 1100° C., depending on crystal modification, type of pigment, throughput and kiln operation (temperature profile).

The pigment quality (rutile content, particle size, particle distribution and optical data) depends, as is known, on the operating conditions and the constancy these conditions in the rotary kiln. For this reason there has in the past been no lack of attempts to improve the operation of the rotary kilns. Thus the rotary kiln may be provided with built-in structures, such as screw-type conveyors or lifting blades, in order to improve the heat transfer. The temperature control can also be optimised in such a way that, irrespective of variations in the quantity or moisture content of the feed material, approximately the same temperature profile is maintained. It is also prior art to a large extent to utilise the heat of the waste gas from calcination and the heat of the discharged furnace clinker, inter alia, by partially returning the waste gas or by using the cooling air introduced to cool down the furnace clinker as primary or secondary air for the rotary kiln. The oxygen content of the gas in the kiln can thus also be maintained more constant.

The rotary kiln process has several advantages and disadvantages. The advantages include a simple and proven technique, the possible use of filter cakes as feed material and a more easily defined transport of solid matter, a trouble-free handling of products in various conditions as well as a well-defined minimum residence time for the pigments.

A disadvantage which has to be mentioned is that calcination in the rotary kiln is relatively expensive and uneconomic as regards operating costs, as the production of larger quantities of pigment (5 to 15 t/h) requires a very large apparatus, which has a high heat loss owing to the large external surfaces. Because of the moving parts, sealing off is frequently only inadequately provided, so that a large quantity of additional air can enter the apparatus. The compact material present at the base also brings about a wide temperature distribution radially within the rotating cylinder. Local peaks in temperature may occur during exothermic processes. Furthermore, during the calcination of the filter cake, products of a lubricating and adhesive nature pass through and this can lead to clogging and congestion in the product flow. A uniform residence time cannot therefore be adhered to.

To compensate for the variations, the calcining conditions have to be adjusted using residence times longer than those under ideal conditions (6 to 12 h). But traces of unwanted elements can thereby diffuse into the rutile. This can lead to uneven and unsatisfactory properties in the products such as, for example, decreased lightness. Owing to the long residence times, moreover, on an exchange of products there may result long transition periods during which constant proportions are still not established.

In order wholly or partly to circumvent the disadvantages of the rotating cylinder technique, thermal treatments of solids in other types of apparatus have been discussed. Alternative ideas for apparatus have accordingly been proposed in the past. Thus the actual drying of the feed material can be conducted in a separate apparatus connected in front, for example, in a fluidized bed dryer or in a spin-flash dryer. An indirectly heated rotary kiln, for example, offers advantages in energy consumption but requires higher investment costs by reason of the heat-resistant materials. Fixed or moving beds with specific residence times have also been proposed. So-called annular open-hearth furnaces or double-deck ovens are also used for applications involving solid matter at elevated temperatures.

Instead of a rotary kiln, it is also possible to use one or preferably several stationary fluidized bed reactors connected one behind the other, which allows one to expect great advantages in economic efficiency as well as an evenness in the temperature and in the gaseous atmosphere and consequently a more constant pigment quality. A disadvantage, however, is that owing to the broad particle size distribution of the feed material (moist or previously dried filter cakes) the gas flow rate necessary for the eddying of the coarse particles results in the discharge of a considerable quantity of fine material.

Where a circulating fluidized bed is used, as described in DE-A 2 524 540 for the reduction of iron ore to magnetite, solid particles of the order of magnitude of from 20 to 300 µm having a sufficiently high abrasion resistance are required. Due to the high fluidising velocities, fine material (<20 µm) is discharged together with the waste gas. Pigments having particle sizes of <10 µm are therefore generally unsuitable for use. Pigment granules such as are described in EP-A 396 975 may, owing to the proportions of binder required, lead to undesirable side effects such as sintering, partial reduction, et cetera, which may adversely affect the optical properties of the pigments.

The object was therefore to provide an economic calcination process for titanium dioxide pigments, whereby moreover pigments of high quality (comparable with or better than the pigments produced in the rotary kiln) are produced and this quality is also delivered consistently.

Surprisingly, it has been found that the set object can be fulfilled when the calcination is carried out under suitable conditions in one or preferably several circulating fluidized beds.

The invention provides a process for the production of titanium dioxide pigments by the decomposition of titanium raw materials using sulphuric acid, hydrolysis of the decomposing solution, filtration of the hydrolysate, optional purification and addition of rutile nuclei and doping chemicals and thermal treatment, which is characterised in that prior to the thermal treatment the hydrolysate is agglomerated into particle sizes of an average diameter of from 0.02 to 10 mm and subsequently this agglomerated hydrolysate is thermally treated in a heated apparatus, wherein the material is stirred up by a gas mixture directed from below upwards in such a way that a gas-solid flow is formed, the gas-solid mixture formed flows from below upwards through the apparatus and, in a second apparatus connected in series, is separated into gaseous and solid components, with the flow of solids being again returned to the heated apparatus, and the product is removed from the lower part of the heated apparatus.

By means of the process according to the invention it is possible to produce $TiO_2$ pigments having consistently good optical properties under improved economic conditions.

The lightness and colour shade of the titanium dioxide pigments depend to a high degree on their content of colouring trace elements, such as for example iron, chromium, vanadium, manganese and copper. The content of these elements must therefore be kept as low as possible. According to the prior art a chemical purification process is carried out in addition to intense washing of the titanium dioxide hydrate:

An inorganic acid, such as hydrochloric or sulphuric acid and a reducing agent are added to the washed titanium dioxide hydrate slurry. Either salts of sulphoxylic acid or metal powders or pastes, such as for example aluminium powders, are used as reducing agents. By means of this procedure the trace elements adsorbed on to the suface of the titanium dioxide are separated off and reduced to form low oxidation numbers (so-called "bleaching"). By means of subsequent intense washing the trace elements can then be almost completely removed.

Part of the separated gas mixture may be returned to the heated apparatus.

A suitable agglomerate may be produced preferably by spraying or atomisation or by pelletising using water or by compaction processes.

In a preferred embodiment of the process, the purified and doped titanium dioxide hydrate is agglomerated to a particle size of from 0.04 to 0.2 mm. This can be effected, for example, by reworking a paste or by agglomeration by spraying or atomisation in a spray-dryer or Venturi dryer or in a dryer equipped with a stirred fluidized bed. A suitable agglomerate can also be produced in a granulator such as, for example, a spray granulator, disc granulator, roller granulator or mixed granulator.

Besides rutile nuclei and doping chemicals, preferably organic and inorganic binders can also be added prior to the agglomeration in order to obtain granules of suitable strength.

The thermal treatment is preferably carried out in several systems of apparatus equipped with a circulating fluidized bed. In an optimal arrangement of the process, up to 5 systems of apparatus equipped with a circulating fluidized bed, preferably from 2 to 5 systems, in practice at stepped temperatures, are connected one behind the other (i.e., in series).

Here different thermal treatment steps such as, for example, heating, drying, sulphate removal and pigment formation can preferably be carried out in several circulating fluidized beds connected one behind the other. The solid matter removed from the final system of apparatus can be led, for example, to a cooling unit and then aftertreated in the conventional manner (for example, grinding, inorganic and/ or organic further treatment, micronisation).

The gas mixture, after being discharged from the separating apparatus (cyclone or electrical precipitator), preferably may be led to another fluidized bed apparatus, advantageously in countercurrent to the flow of solids, in order to further utilise the enthalpy. The final system of apparatus preferably has the highest temperature, which is attained preferably through the combustion of suitable heating materials, such as natural gas or oil, either by an external production of flue gas (indirectly) or by a combustion within the fluidized bed (directly). The temperature should preferably be between 800° and 1000° C. and can also be produced electrically.

For the treatment of the solid matter in the fluidized beds, preferably a constant gaseous atmosphere containing from 5 to 20 Vol.-%, preferably from 10 to 15 Vol.-% oxygen, is established.

The ratio of gas to solid in the heated apparatus is adjusted preferably to 200 to 1300 $Nm^3/t$ pigment.

Preferably an effective gas flow rate of from 0.4 to 10 m/s, preferably from 3 to 6 m/s, referred to the empty apparatus, is established.

The pressure loss in a fluidized bed should preferably be so established that the average residence time of the solid matter is between 0.1 and 1 hours, preferably between 0.2 and 0.5 hours.

The minimum residence time of the solid matter should preferably be more than 6 minutes.

The circulating fluidized beds can also be combined with other types of apparatus, for example, with a retention tank, for example, for crystal maturation.

The titanium dioxides thus produced are used for the colouring of paints, dyes, plastics, paper, ceramic, enamel, building materials, rubber, bitumen, cosmetics, foods, and for other industrial applications such as, for example, welding electrodes catalysts and UV absorbers.

EXAMPLES

In the following Examples 1 to 3 a commercially produced titanium dioxide hydrolysate was used. A decomposing solution having the following composition was prepared by decomposing ilmenite (approx. 56% $TiO_2$) and titanium slag (approx. 78% $TiO_2$) using sulphuric acid:

| | |
|---|---|
| TiO$_2$ | 219 g/l |
| H$_2$SO$_4$ total | 34 wt. % |
| H$_2$SO$_4$ free | 28 wt. % |
| FeSo$_4$ | 9 wt. % |
| Ti$^{3+}$ | 1.9 g/l |

The decomposing solution was then hydrolysed by the addition of hydrolysing nuclei and water. The product was then filtered and washed. The titanium dioxide hydrolysate obtained was bleached (reducing treatment with aluminium paste and hydrochloric acid) and again washed. 4 wt. % of rutile nuclei and in addition 0.31 wt. % of Na$_2$O, 0.23 wt. % of K$_2$O, 0.12 wt. % of P$_2$O$_5$ and 0.62 wt. % of Al$_2$O$_3$ (in each case referred to TiO$_2$) were added as adjusting chemicals.

Example 1 (Comparison)

The hydrolysate prepared above was dehydrated through a pressure filter to a solids content of 44 wt. % of TiO$_2$ and then placed in a directly heated rotary kiln. The total residence time of the product in the kiln was about 10 hours, the furnace clinker was discharged at a temperature of 965° C. On cooling, the furnace clinker showed the following characteristic values:

| | |
|---|---|
| rutile content: | 99.7% |
| whitening power: | 590 |
| grey scale value R$_z$-R$_x$: | 2.8 |
| lightness R$_y$: | 92.9 |
| yellow cast R$_x$-R$_z$: | 3.4 |

The whitening power was determined in the following manner: 100 mg of pigment on a small watchglass is weighed on the analytical balance. 5.0 g of grey paste on a second, larger watchglass is weighed on the standard balance. The 100 mg portion of TiO$_2$ together with the 5.0 g of grey paste are placed on the lower muller plate (glass plate) of the automatic muller, premixed free of losses and, under the full force of the muller plate (1.4 N/cm$^2$), ground in five stages of 25 revolutions each. After each stage the paste is collected into the centre using a plastic spatula.

The finally dispersed grey paste is rubbed smooth into the paste dish using a knife and measured by means of the colorimeter; the values R$_x$, R$_y$, R$_z$, R$_z$-R$_x$ (grey scale value) are determined.

The reference pigment (standard) is produced in the same manner as the samples.

The brightness in Alkyldal L 64 was determined in accordance with DIN 55 983 (DIN ISO 787) in the following manner:

| | |
|---|---|
| Apparatus: | balance, accuracy ± 0.001 g |
| | automatic muller |
| | paste dish and knife |
| | watchglasses (diameter 8 cm) |
| | colorimeter with permanently connected computer and printer |
| Auxiliary substance: | White paste for determining the brightness |
| | The paste was prepared as follows: 963 g of Alkyldal L 64, 100%, (Bayer AG) is mixed with 52 g of Aerosil 200 (Degussa) and dispersed in one operation by means of a three-cylinder mill. |
| Operating method: | The quantity of TiO$_2$ pigment corresponding to 0.3294 ml (0.3294 ml × density = initially weighed quantity in g) together with 2.000 g of white paste from the paste dispenser are placed on the lower muller plate (covered with polyamide foil), premixed free of losses and, under the full force of the muller plate (1.4 N/cm$^2$), ground in four stages of 25 revolutions each. After each stage the paste is collected into the centre using a plastics spatula. |

The finally dispersed white paste is rubbed smooth into the paste dish using a knife and, up to the point of being measured by means of the colorimeter, is covered with a lightproof black cover in order to avoid possible discolorations due to phototropy. The values R$_x$, R$_y$, R$_z$, R$_x$-R$_z$ (yellow cast) are determined.

The reference pigment is produced in the same manner as that of the samples.

Example 2 (according to the invention)

The compressed filter cake prepared in Example 1 was rediluted with water to a solids content of 28 wt. % of TiO$_2$ and then dried in a nozzle spray dryer having an evaporating efficiency of 50 kg/h. The dried material had a TiO$_2$ content of 81.2 wt. % and an average particle size of approx. 0.06 mm.

Calcination was carried out in a calcining unit equipped with a circulating fluidized bed. The diameter of the fluidized bed kiln was 125 mm at a shaft height of 1800 mm. The fluidising air was led, by means of a rotary piston blower, into the shaft from below through nozzles with lateral openings. The air was partly replaced by oxygen in order to decrease the flow rate. Heating was carried out by means of a gas lance equipped with four lateral and one central opening. The fuel employed was natural gas. The kiln waste gases passed through a recirculating cyclone, in which the solid matter transported out of the fluidized bed was separated and returned directly to the fluidized bed through a pipe closed by a shuttle valve. The content of the fluidized bed is maintained constant by the differential pressure. The average residence time over this is varied.

The heating gas, after it had passed through the recirculating cyclone, was led through a waste gas cyclone for separation of the solid matter still present.

The material was introduced into the fluidized bed a little below the centre of the shaft by means of a screw-type conveyor operable at a controllable speed.

The operating conditions in the circulating fluidized bed were as follows:

| | | |
|---|---|---|
| fluidising air | [Nm$^3$/h] | 3.0 |
| oxygen | [Nm$^3$/h] | 3.0 |
| natural gas | [Nm$^3$/h] | 1.9 |
| temperature of bed | [°C.] | 950 |
| Δp of kiln | [mbar] | 15 |
| charge | [kg/h] | 4.2 |
| discharge from bed | [kg/h] | 2.2 |
| discharge from cyclone | [kg/h] | 1.2 |
| O$_2$ in waste gas | [vol.-%] | 13.5 |
| average residence time | [min] | 45 |

The clinker obtained as discharge from the bed showed the following characteristic values after being ground for 30 minutes in an agate mill:

| | |
|---|---|
| rutile content: | 95% |
| whitening power: | 520 |
| grey scale value R$_z$-R$_x$: | 2.9 |

| | |
|---|---|
| lightness $R_y$: | 92.1 |
| yellow cast $R_x-R_z$: | 3.9 |

The pigment data show that the optical characteristic values of a product calcined in the rotary kiln are still not entirely achieved in a single-stage circulating fluidized bed, as there is a wide distribution of residence times and consequently the individual pigment particles of the end product have undergone different calcining times. Owing to the content of over-calcined product, the furnace clinker exhibits a greater grinding hardness as compared with the clinker from the rotary kiln. But it can also be seen from the Example that $TiO_2$ pigment clinker having properties approximately conforming to type can be produced even in a single-stage circulating fluidized bed.

Example 3 (according to the invention)

The titanium dioxide hydrolysate predried as in Example 2 was thermally treated in a three-stage calcining unit equipped with a circulating fluidized bed. The heating gas was passed in countercurrent, that is, introduced into the final reactor and withdrawn from behind the first reactor. The individual temperatures of the beds were 650° C. for the first reactor, 800° C. for the second reactor and 940° C. for the third reactor. The total residence time in the three-stage calcining unit equipped with a circulating fluidized bed was 2 hours.

Figure 1:
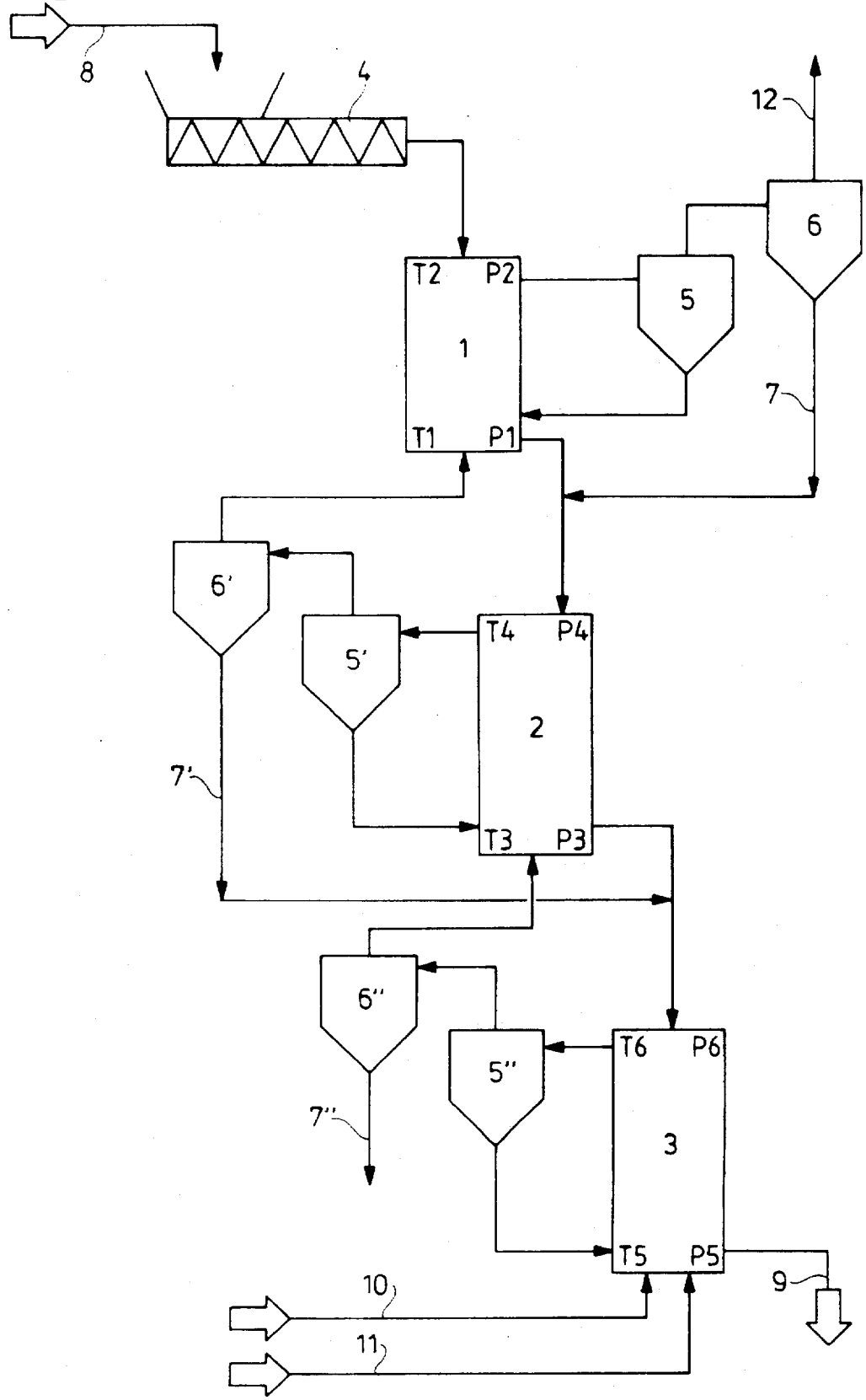
FIG. 1 shows a 3-stage unit for calcination in a circulating fluidized bed.

The 3-stage unit for calcination in the circulating fluidized bed is explained in more detail by means of the enclosed diagram:

The dry product (8) produced according to Example 2 is fed via a metering screw (4) into the first fluidized bed reactor (1), which is provided with temperature and pressure measuring points at the gas inlet (T1, P1) and gas outlet (T2, P2) ends. In order to generate the circulating hot fluidized bed the off-gas from the second fluidized bed reactor (2) is used after it has issued from the off-gas cyclone (6). The furnace off-gas from reactor (1) passes through a recycling cyclone (5) in which the solid entrained from the fluidized bed is separated off and recycled directly into the fluidized bed reactor (1). The content of the fluidized bed is kept constant by means of the differential pressure (P1-P2). The average residence time is set by means of this differential pressure. After the hot gas has passed through the recycling cyclone (5) it is passed through an additional off-gas cyclone (6) for the separation of any solids (7) still present. These solids are appropriately added to the material discharged from the bed of reactor (1), although they can also be discharged separately. The off-gas (12) from the off-gas cyclone (6) of reactor (1) contains not only the combustion ingredients of the natural gas ($CO_2$, $H_2O$) but also nitrogen, oxygen and cleaved sulphuric acid and its decomposition products sulphur dioxide and sulphur trioxide.

The material discharged from the bed of reactor (1) is used as the raw feed material for reactor (2), which has the same technical design and measuring devices as reactor (1). Whereas reactor (1) has a bed temperature of 650° C., reactor (2) is preferably heated to 800° C. by the heating and fluidising gas issuing from reactor (3). In a similar manner the material discharged from the bed of reactor (2) is used as the raw feed material for reactor (3). Natural gas, air, as well as oxygen, are fed from the bottom into reactor (3)—as described in Example 2. The combustion taking place directly in the fluidized bed is controlled in such a manner that a bed temperature of 940° C. is establised in reactor (3). The corresponding measuring points for the temperature (T5, T6) and the differential pressure (P5-P6) are arranged in the same manner as in reactor (2) and (1). The material discharged from the bed of reactor (3) is removed above the gas inlet point and represents the calcined end product. The material (7") discharged from the off-gas cyclone (6") can, depending on the raw material and quality requirements, be discharged separately or can be mixed with the discharged solid (9).

The clinker removed from the third reactor showed the following characteristic values:

| | |
|---|---|
| rutile content: | 99.8% |
| whitening power: | 610 |
| grey scale value $R_z-R_x$: | 2.8 |
| lightness $R_y$: | 93.1 |
| yellow cast $R_x-R_z$: | 3.2 |

As may be seen from the data, in the circulating fluidized bed it was possible to produce a $TiO_2$ clinker which, compared with the material produced in the rotary kiln, has a higher whitening power, a greater lightness and a lower yellow cast.

What is claimed is:

1. A process for the production of titanium dioxide pigments comprising the following steps:
   a) adding titanium raw materials to sulphuric acid to form a decomposing solution;
   b) hydrolyzing the decomposing solution;
   c) filtering the decomposing solution to obtain a solid filter product;
   d) washing the solid filter product to obtain a titanium dioxide hydrolyzate;
   e) adding rutile nuclei and doping chemicals to the titanium dioxide hydrolyzate to form a calcining mixture;
   f) agglomerating the calcining mixture into particle sizes of an average diameter of from 0.02 to 10 mm;
   g) thermally treating the agglomerated calcining mixture in a heated apparatus, wherein the agglomerated calcining mixture is stirred up by a flow of gas directed from below upwards in such a way that a gas-solids mixture is formed, and the gas-solids mixture flows from below upwards through the apparatus and, in a second apparatus connected in series, is separated into gaseous and solid components with the solids being returned to the heated apparatus, and the product is removed from the lower part of the heated apparatus.

2. The process according to claim 1, wherein part of the separated gaseous component is returned from the second apparatus to the heated apparatus.

3. The process according to claim 1, wherein the calcining mixture is agglomerated by spraying or atomization.

4. The process according to claim 1, wherein the calcining mixture is agglomerated by pelletizing using water as a binder or by compaction processes.

5. The process according to claim 1, wherein the average particle size of the agglomerates is between 0.04 and 0.2 mm.

6. The process according to claim 1, wherein the ratio of gas to solid in the heated apparatus is 200 to 1300 $Nm^3/t$ pigment.

7. The process according to claim 1, wherein the heated apparatus is a calcining unit equipped with a circulating fluidized bed having an effective gas flow rate of from 0.4 to 10 m/s, referred to the empty apparatus.

8. The process according to claim 1, wherein the average residence time of the solids in the fluidized bed in between 0.1 and 1 hours.

9. The process according to claim 8, wherein the average residence time of the solids in the fluidized bed is between 0.2 and 0.5 hours.

10. The process according to claim 1, wherein the minimum residence time of the solids in the heated apparatus is more than 6 minutes.

11. The process according to claim 7, wherein the effective gas flow rate is from 3 to 6 m/s, referred to the empty apparatus.

12. The process according to claim 1, wherein the heated apparatus is heated directly or indirectly using a combustible fuel or is heated electrically.

13. The process according to claim 1, wherein the heated apparatus uses a constant atmosphere containing from 5 to 20 Vol.-% oxygen during the thermal treatment.

14. The process of claim 13, wherein the gaseous atmosphere contains from 10 to 15 Vol.-% oxygen during the thermal treatment.

15. The process according to claim 1, wherein in step e) organic or inorganic binders are added to the calcining mixture prior to the agglomeration step.

16. A method of using the titanium dioxide produced according to the process of claim 1, wherein the titanium dioxide is added, as a colouring agent, to paints, dyes, plastics, paper, ceramic, enamel, building materials, rubber, bitumen, cosmetics, or foods.

17. A process for the production of titanium dioxide pigments comprising the following steps:

a) adding titanium raw materials to sulphuric acid to form a decomposing solution;

b) hydrolyzing the decomposing solution;

c) filtering the decomposing solution to obtain a solid filter product;

d) washing the solid filter product;

e) purifying the washed solid filter product to obtain a titanium dioxide hydrolyzate;

f) adding rutile nuclei and doping chemicals to the titanium dioxide hydrolyzate to form a calcining mixture;

g) agglomerating the calcining mixture into particle sizes of an average diameter of from 0.02 to 10 mm;

h) thermally treating the agglomerated calcining mixture in a heated apparatus, wherein the agglomerated calcining mixture is stirred up by a flow of gas directed from below upwards in such a way that a gas-solids mixture is formed, and the gas-solids mixture flows from below upwards through the apparatus and, in a second apparatus connected in series, is separated into gaseous and solid components, with the solids being returned to the heated apparatus, and the product is removed from the lower part of the heated apparatus.

18. A process for the production of titanium dioxide pigments comprising the following steps:

a) adding titanium raw materials to sulphuric acid to form a decomposing solution;

b) hydrolyzing the decomposing solution;

c) filtering the decomposing solution to obtain a solid filter product;

d) washing the solid filter product to obtain a titanium dioxide hydrolyzate;

e) adding rutile nuclei and doping chemicals to the titanium dioxide hydrolyzate to form a calcining mixture;

f) agglomerating the calcining mixture into particle sizes of an average diameter of from 0.02 to 10 mm;

g) thermally treating the agglomerated calcining mixture in at least two systems which are connected in series so that the agglomerated calcining mixture is initially introduced into a first system and finally removed from a last system located downstream from the first system, wherein each system comprises i) a reactor containing a fluidized bed, and ii) a separating unit, and the temperature in each system is different than the temperature in every other system, further wherein in the first system, the agglomerated calcining mixture is introduced into the reactor of the first system from a port and then stirred up by a flow of gas which originates from a point below the port and then travels upwards towards the port so that a gas-solids mixture is formed, with the agglomerated calcining mixture as the solids component, and the gas-solids mixture then flows upwards through the reactor of the first system and into the separating unit of the first system wherein the gas-solids mixture is separated into gaseous and solid components, with the solids being returned into the reactor of the first system and the gaseous component being removed, and the product from the first reactor is removed from the lower part of the reactor and introduced into the next reactor of the next system.

19. The process of claim 18, wherein the at least two systems consists of from 2 to 5 systems.

20. The process according to claim 19, wherein the average residence time of the solids in each of the fluidized beds is between 0.2 and 0.5 hours.

21. The process of claim 18, wherein the at least two systems consists of from 2 to 5 systems that are connected one behind the other so that the agglomerated calcining mixture is initially introduced into the first system and finally removed from the last system after the thermal treatment step is complete, further wherein the temperature is the last system is higher than the temperature in the first system.

22. The process according to claim 21, wherein the average residence time of the solids in each of the fluidized beds is between 0.2 and 0.5 hours.

23. The process according to claim 18, wherein the agglomerated calcining mixture is thermally treated in two or three of said systems, further wherein the average residence time of the solids in each of the fluidized beds is between 0.1 and 1 hours.

24. The process according to claim 18, wherein the agglomerated calcining mixture is thermally treated in three systems, further wherein the average residence time of the solids in each of the fluidized beds is between 0.1 and 1 hours.

* * * * *